Jan. 14, 1964 J. M. B. CLERGUE ETAL 3,118,085
ELECTRONIC MARKING APPARATUS FOR THE GENERATION OF MARKER SIGNS
Filed Dec. 9, 1959 4 Sheets-Sheet 4

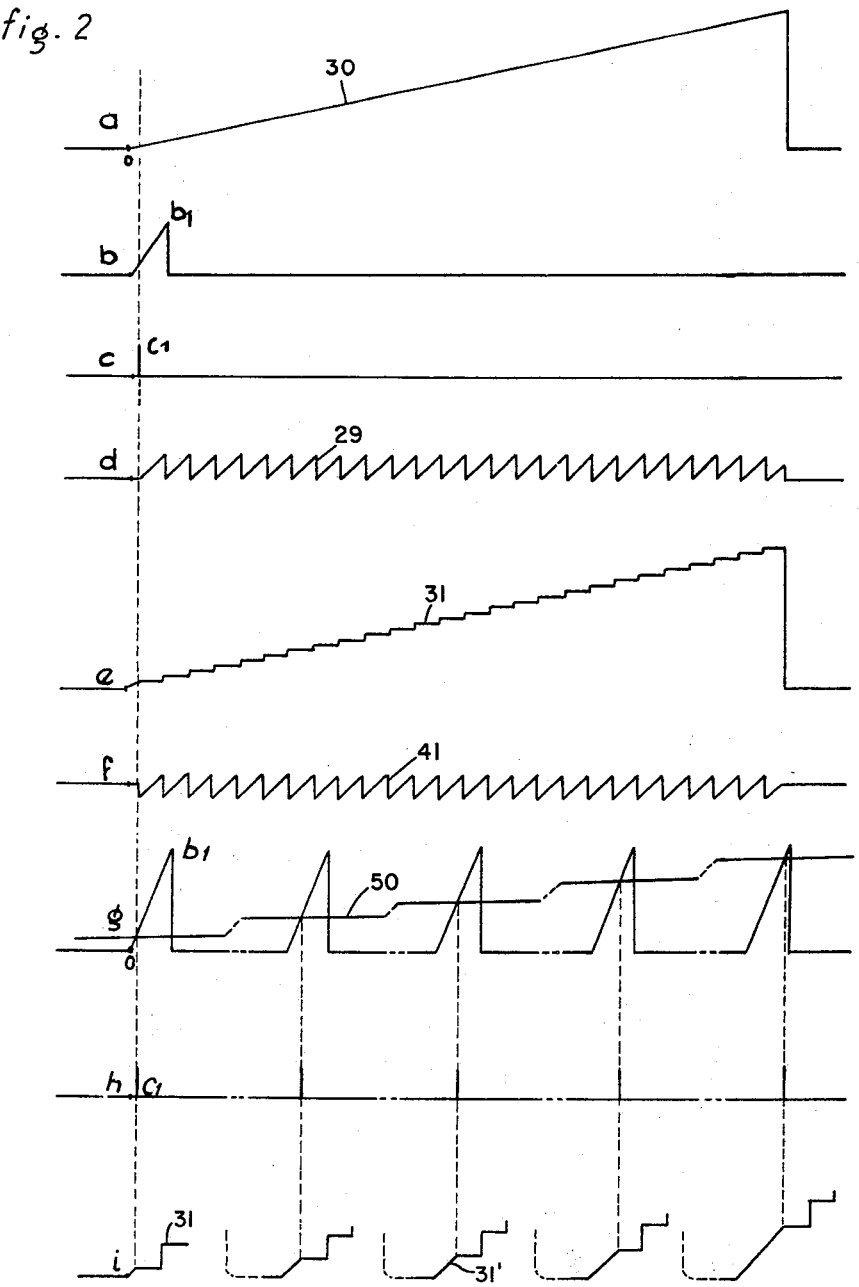
fig. 2
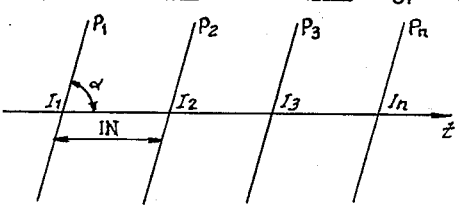
fig. 3

INVENTORS
JEAN M.B. CLERGUE
YVES E.M. LONDE
BY
THEIR AGENT

United States Patent Office 3,118,085
Patented Jan. 14, 1964

3,118,085
ELECTRONIC MARKING APPARATUS FOR THE GENERATION OF MARKER SIGNS
Jean M. B. Clergue, St. Gratien, and Yves E. M. Londe, Montreuil sous Bois, France, assignors to the Societe Nouvelle d'Electronique, a corporation of France
Filed Dec. 9, 1959, Ser. No. 858,365
Claims priority, application France Dec. 29, 1958
8 Claims. (Cl. 315—26)

The present invention relates to an electronic marking apparatus for the generation of marker signs.

In many instances it is desired to provide on a display indicator, such as the screen of a cathode-ray tube, a series of parallel marker lines visible in full for purposes of comparison with message signals electronically produced on such screen.

An object of this invention is to provide means for generating an array of equispaced parallel marker lines of this type on an observation screen in such manner that their spacing, their number and, preferably, their angle of inclination relative to a predetermined reference direction can be conveniently and independently adjusted.

Another object of our invention is to provide means for progressively displacing the array of marker lines at a slow and preferably adjustable drift speed across the screen along one of the co-ordinates of the display system, e.g. in the direction of horizontal deflection of the luminous spot of the tube.

A further object of the invention is to provide means for enabling the aforementioned adjustments to be carried out through simple modification of a small number of component signals used in the generation of the marker lines.

The foregoing objects are realized, in accordance with our instant invention, by means of a plurality of sawtooth-wave generators of different period or duration, the relatively short-period sawteeth from one generator being impressed upon one of the deflection means of a cathode-ray tube (e.g. the vertical sweep circuit thereof) whereas the output of another generator, consisting of sawteeth of relatively long duration, is applied to the other deflection means (e.g. the horizontal sweep circuit) in combination with the aforementioned short-period sawteeth from the first generator. The short-period sawtooth signal applied to the last-mentioned deflection means has a component which combines with a long-period sawtooth to produce a composite stepped wave hereinafter referred to as a staircase signal. Another component of the short-period sawtooth signal coacts with the same signal as applied to the first-mentioned deflection means to produce a series of parallel traces which will generally be inclined with reference to the co-ordinate system and whose slopes vary with the relative amplitudes of these short-period sawteeth as applied to the two deflecting means. The amplitude of the staircase signal, easily varied by a proportional variation of the amplitudes of both sawtooth signals, determines the mutual separation of the lines whereas the length of the array, thus the number of lines therein, is controlled by the duration of the staircase signal which in turn corresponds to the length of the long-period sawtooth. As these parameters may be independently varied, the spacing and the slope of the lines as well as their number can be selected at will.

The progressive displacement of the lines across the screen is accomplished, according to another feature of our invention, with the aid of a further generator whose output is a sawtooth wave of a period considerably greater than those of the aforementioned sawtooth waves; it will thus be convenient to define the three sawtooth signals referred to as a short-period, an intermediate-period and a long-period signal, respectively. A trigger pulse, periodically produced by a suitable source at a recurrence rate corresponding to a cycle length which is greater than the duration of any intermediate-period sawtooth but substantially less than the duration of the long-period sawtooth from the last-mentioned generator, initiates the generation of the intermediate-period sawtooth and of a sloping reference pulse of a duration comparable to that of the short-period sawteeth. The amplitude of this reference pulse and of the long-period sawtooth are compared to give rise to a timing pulse whenever these amplitudes maintain a predetermined relationship, e.g. are equal. The timing pulse, which thus lags after the trigger pulse, initiates the generation of a train of short-period sawteeth whose phase relationship with the intermediate-period sawtooth is determined by the instantaneous amplitude of the long-period sawtooth then in existence, hence this phase relationship progressively varies from one train of short-period sawteeth to the next. As a result, the staircase signal produced by the superposition of a train of short-period sawteeth upon an intermediate-period sawtooth has a sloping leading-edge portion whose length varies with the aforementioned lag between the trigger and timing pulses and which is followed by a stepped portion of the pulse edge. The varying extent of the sloping leading-edge portion progressively changes the position of the array of marker lines due to a train of short-period sawteeth so as to create the appearance of a drifting of these lines across the screen. Since the drift speed depends upon the relative slopes of the long-period sawtooth and of the reference pulse, its magnitiude can be adjusted independently of the other parameters mentioned above.

The invention will be more clearly understood by reference to the following description of an embodiment, given by way of nonlimitative example, with reference to the accompanying drawing in which:

FIGURE 2 is a series of graphs serving to explain the different stages in the generation of the marker signs in the system of FIGURE 1;

FIGURE 3 shows a set of parallel solid lines generated in the marking apparatus according to the invention.

Figure 1:
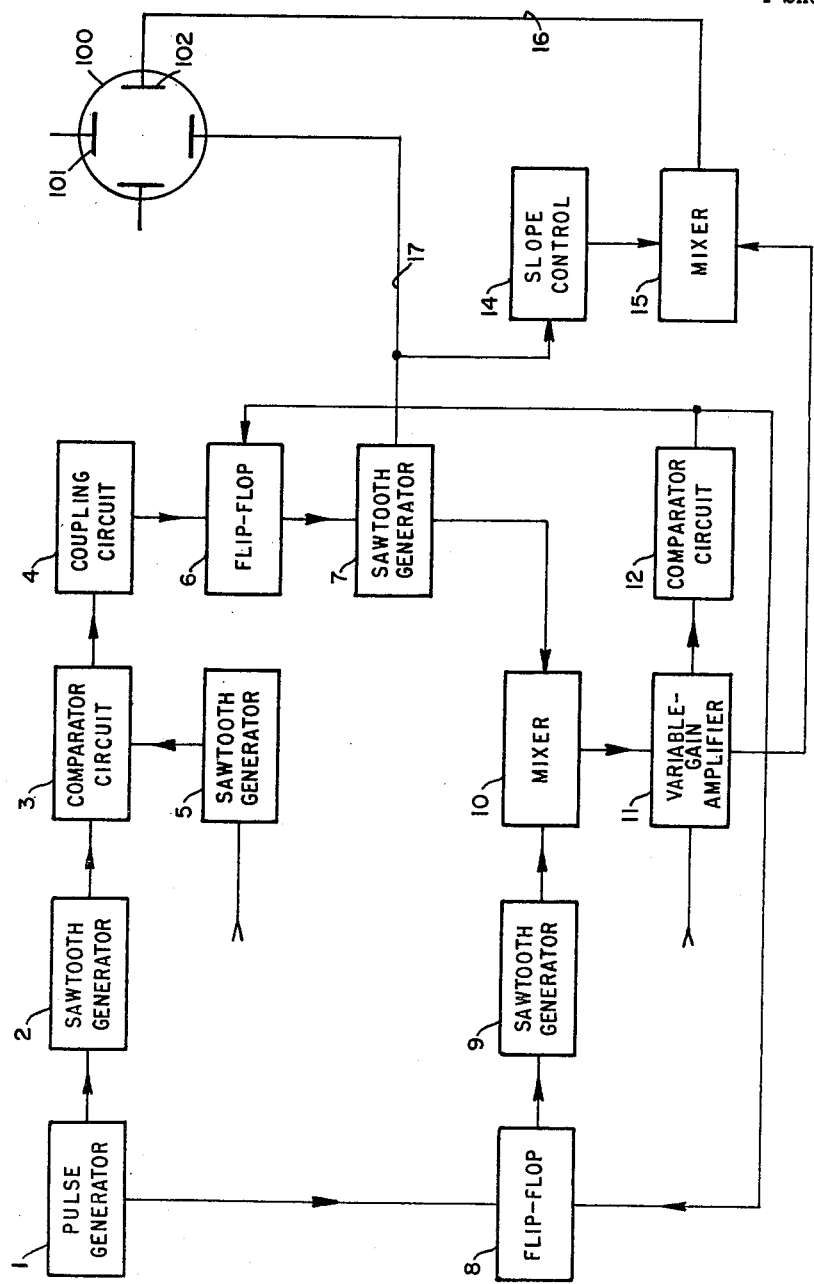
FIGURE 1 is a block diagram showing the operating sequence of a system according to the invention for the generation of marker signs.

By reference to the block diagram of FIGURE 1, a description of the sequence of operations required to generate the desired marker signs will now be given.

As a rule, the marker signs are generated only during a fraction of the total period reserved for the observation of the electrical phenomena inscribed on the screen, i.e., during the period in which the video signals they must mark or distinguish, are not transmitted. The beginning of this partial period is marked by the transmission of a pulse from a source 1 which will trigger the whole generation process of the marker lines.

This pulse triggers, on the one hand, an intermediate-period-sawtooth generator 9 and, on the other, a short-period-sawtooth generator 2, both sawtooth signals contributing to generate the aforementioned staircase signal.

The single rising pulse $b_1$ produced by sawtooth generator 2 (curve $b$ of FIGURE 2) is compared in the comparator circuit 3 with a sawtooth signal 50 (graph $g$, FIGURE 2) of considerably longer duration than the already identified sawtooth signals, which determines the drift speed of the marker lines and is delivered by another sawtooth generator 5. The comparator circuit 3 gives rise to a timing pulse $c_1$ (curve $c$ of FIGURE 2) which is delayed with respect to the start of the intermediate-period sawtooth signal as represented by curve

*a* of FIGURE 2. This delayed pulse controls through a coupling circuit 4 a bistable or flip-flop circuit 6 which, when triggered, causes the short-duration sawtooth-signal generator 7 to produce an output 29 (curve *d* of FIGURE 2).

The aforementioned triggering of the intermediate-period sawtooth signal 30 from generator 9 (curve *a* of FIGURE 2) by the start pulse from generator 1 occurs through the flip-flop circuit 8. The two signals 29, 30 respectively issuing from generators 7 and 9 are mixed in the circuit 10 delivering a "staircase" signal 31 (curve *e* of FIGURE 2).

A particularity of this staircase signal consists in the fact that its first step is of variable amplitude, this arrangement causing a drifting of the generated lines across the screen of a cathode-ray tube 100 on which their locations are determined by the horizontal levels of the different steps; the delay affecting the position of pulse *c*1 is continuously varied during a number of generation cycles, defining so the displacement of the lines which change their positions from one cycle to the other since, as shown in curves *g*, *h*, *i*, of FIGURE 2, the pulse *c*1 (and, therefore, the beginning of the stepped portion of staircase signal 31) always coincides with the intersection of the leading edges of sawtooth signals *b*1 and 50. The adjustment of the interval between the lines is made in the circuit 11 which receives on the one hand the staircase signal 31 and on the other a signal proportional to the desired interval; this involves a change in the amplitude of the staircase signal, the circuit 11 being, for instance, a variable-gain amplifier. The adjustment of the slope of the lines with respect to a given reference direction, vertical or horizontal for instance, is made in the circuit 14 which receives from the circuit 7 the short-duration sawtooth signal 29 (curve *d*, FIGURE 2) the amplitude of which is adjusted in accordance with the desired angle of inclination $\alpha$ (FIGURE 3). The superposition of staircase signal 31 and of the short-duration sawtooth signal *d*, whose amplitude is adjusted according to the desired angle $\alpha$, gives rise to steps which are inclined at this angle with respect to a given direction; this angle of inclination is maintained for the parallel lines when the signal issuing from slope-control circuit 14 is sent to a lead 17 which controls the vertical-deflection electrodes 101 of the associated cathode-ray tube 100.

This sawtooth signal 41 (curve *f*), however, has been shifted with respect to that shown at 29 in curve *d*, being now symmetrical with respect to its time axis *t* (the abscissa axis, for instance). This causes the resulting parallel lines $p^1$, $p^2$, . . . $p^n$ (FIGURE 3) to tilt around their midpoints $I1$–$I2$, . . . $In$. The mixing of the stepped sawtooth 31 issuing from circuit 11 and of the signal issuing from circuit 14 is made in circuit 15, the mixed signal delivered at a lead 16 is transmitted to the horizontal deflection circuit of cathode-ray tube 100.

It is obvious that if the orientation of the lines $p^1$ etc. on the screen of tube 100 is to be reversed, it is sufficient to reverse the sign of the signal applied to the vertical deflection circuit 17.

An embodiment of the electronic marking apparatus according to the invention will now be given with reference to FIGURES 4 and 5 which particularly show the different circuits of the block diagram identified by the same reference number.

Figure 4:
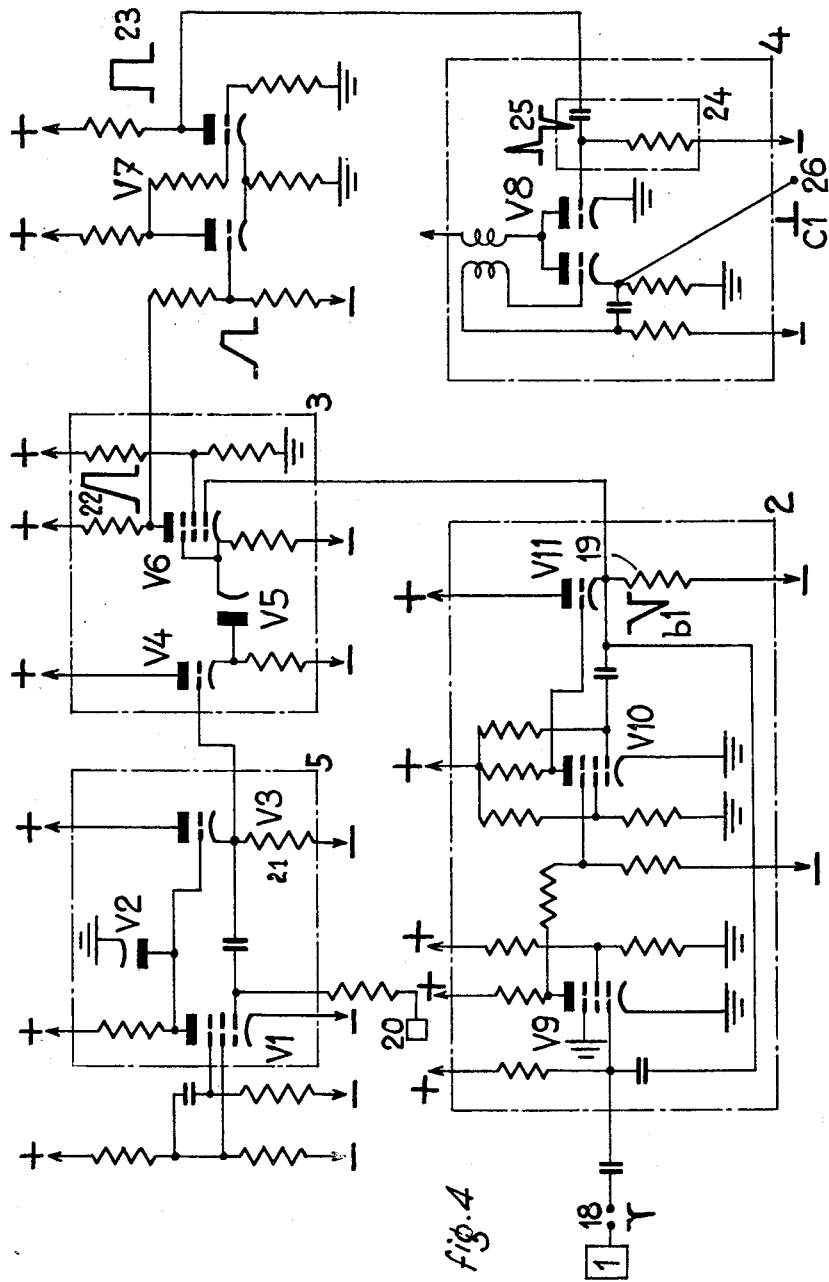
FIGURES 4 and 5 illustrate the circuit arrangement of the marking apparatus.

As shown in FIGURE 4, at the input 18 a start pulse generated in circuit 1 triggers the generation of the parallel lines $p^1$ etc. (FIGURE 3) in the marking apparatus. This short pulse is applied, with negative polarity, to the control grid of tube V9 which is part of the sawtooth generator 2. This generator, which comprises tubes V9 and V10, is known as a sanatron; the triggering pulse at 18 blocks the tube V9 and the signal appearing at the anode of that tube is impressed on the suppressor grid of tube V10, rendering it conductive. The operation of the latter tube is based upon the Miller effect. The anode of tube V10 is connected to the control grid of triode V11 which is a cathode follower. At the cathode resistance 19 of tube V11 a pulse *b*1 is delivered; this pulse is that shown by curve *b* of FIGURE 2, but with negative polarity. This pulse *b*1 is now sent to the comparator 3 where it will be compared with the sawtooth signal 50 (FIGURE 2) of very long duration which determines the drift speed of the marker. The long-period sawtooth signal 50 is produced in the screen-coupled phantastron 5 which comprises tubes V1, V2 and V3. Its operating conditions are supposed here to be known and will not be specially described; they can be found, for instance, in the M.I.T. book "Waveforms" if needed. The duration of this sawtooth signal is controlled by means of an input circuit 20, not further described here. The drift-speed signal 50 is developed at the terminals of the cathode resistance 21 of tube V3 and is transmitted to the control grid of the cathode follower V4. Tube V4 is part of the comparator circuit 3 which comprises also tubes V5 and V6. The signal appearing at the cathode resistance tube V4 is applied at low impedance to the anode of diode V5. This diode is blocked as long as its cathode potential is greater than that of its anode. When those potentials are the same, diode V5 becomes conductive. The tube V6 is normally conducting as long as its control grid is at a potential higher than the cut-off potential of the tube. This grid receives the pulse *b*1 of negative polarity. When diode V5 is conductive, the cathode of tube V6 remains at the potential of the anode of tube V5 and as the potential of the control grid of tube V6 decreases, in consequence of the application of the pulse *b*1, tube V6 blocks; the potential of the anode of this tube then increases and a pulse 22 is obtained at the output of the tube V6. The pulse 22 is applied to a Schmitt multivibrator V7 which delivers a square pulse 23. The front edge of this square pulse 23 is differentiated in the resistance-capacitance network 24. The positive part of the pulse 25 obtained as a result of the differentiation is applied to the blocking oscillator V8 which gives rise to the pulse *c*1 delivered at 26. This pulse *c*1 is delayed with respect to the input pulse received at 18 as described with reference to FIGURE 2.

Figure 5:
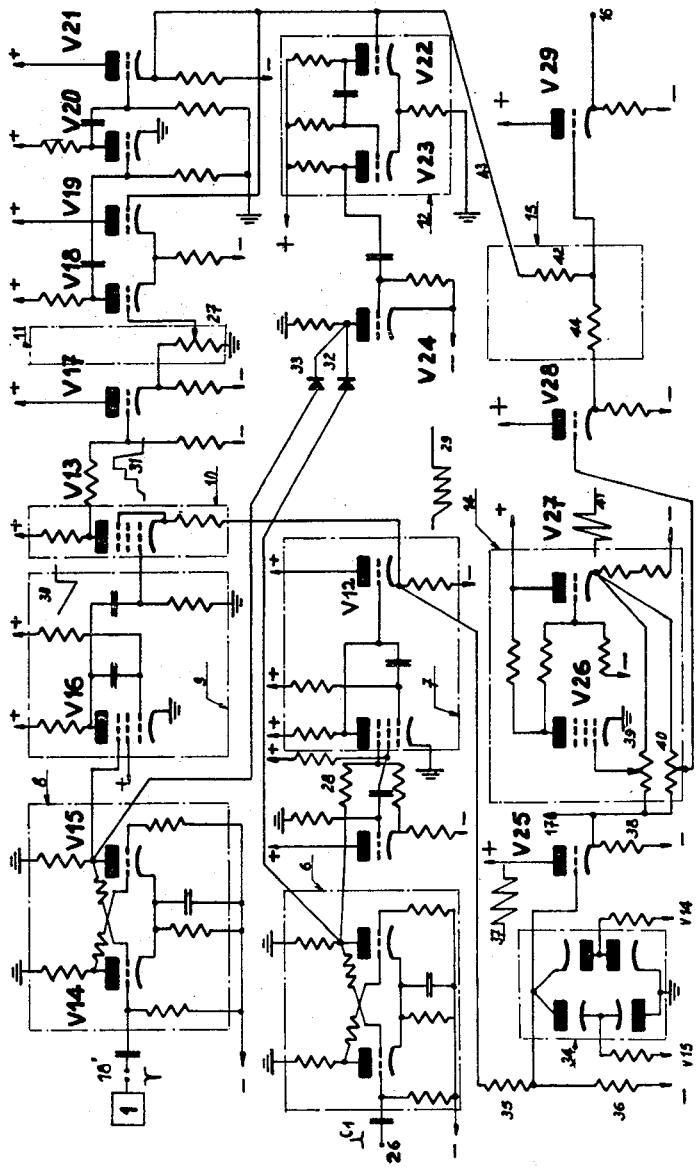

FIGURE 5 shows how, along with the application of the delayed pulse *c*1 to the plate-grid-coupled bistable multivibrator 6, the input pulse generated in circuit 1 is fed to the input 18' of the plate-grid coupled bistable multivibrator 8. Each bistable multivibrator will generate a pulse which triggers respectively the short-period-sawtooth generator 7 and the intermediate-period sawtooth generator 9.

The short-duration sawtooth generator 7 is a transitron circuit which operates only if the input conductor 28 is at ground potential, i.e. at that of the cathode of the associated pentode tube. When this transitron is operating, the short-duration sawtooth pulses 29 appear with negative polarity at the cathode resistance of the cathode follower V12. A transmission path for these pulses extends to the cathode of tube V13, constituting the circuit 10, which is a mixer tube receiving on its control grid the intermediate-period sawtooth pulses 30 produced by generator 9 in response to a trigger pulse from the anode of tube V15 of the bistable multivibrator 8.

At the output of the mixer circuit 10, i.e. the anode of tube V13, a staircase signal 31 is then obtained whose first step has a variable amplitude.

As has been already explained in the above description, the variations of some of the characteristics of the marker lines shown in FIGURE 3 result from variations imparted to the basic signals used, namely the staircase signal 31 and its component sawtooth signals 29, 30.

In the circuit 11, the adjustment of the interval or spacing between two successive parallel lines $p^1$ etc. is made by means of potentiometer 27 which varies the amplitude of the steps of the staircase signal 31, delivered at low impedance by the cathode follower V17. This potentiometer can be operated by remote control if desired. The signal appearing at 27 is amplified in an amplifier comprising the tubes V18, V19 and V20, V21. Tubes V18 and V19 constitute a differential amplifier, a feedback circuit extending between the output of the cathode follower V21 and the control grid of tube V19; this arrangement allows for the use of low-capacitance condensers, which do not alter the signal 31 developed across a low impedance, and increases the stability of this unit.

The output of tube V21 is connected to the control grid of tube V22 which in connection with tube V23 constitute a flip-flop circuit 12 (see also FIGURE 1). The triggering threshold of said flip-flop circuit constitutes the comparison potential level determining the number of parallel lines which appear on the cathode-ray tube screen; the pulse issuing from tube V23 is applied to conductors 32 and 33 through tube V24 and then to the bistable circuits 6 and 8 to reset them to their initial condition, the generating cycle for the marker lines being so terminated. In the meantime, to adjust as desired the slope of these marker lines, the short duration sawtooth pulses 29 are applied to the control grid of tube V25. A bidirectional clamp circuit 34 establishes a reference potential on the control grid of tube V25 when no other signal is applied to it. This arrangement together with the bridge resistances 35 and 36 serves, when signal 29 is applied, to convert this signal into a train of sawtooth pulses 37 symmetrical with respect to its time axis. This balanced signal, which appears at the cathode resistance 38 of tube V25, is transmitted, on the one hand, to the vertical deflection circuit 17 and to the circuit comprising tubes V26 and V27. On the other hand this signal is applied to resistances 39 and 40. The circuit comprising tubes V26 and V27 inverts the polarity of signal 37. This inversion is made with a high rate of stability; tube V26 has a high gain so that the signals 37, 41 at the input and at the output thereof are of the same magnitude but of opposite polarity. The potentiometer 40 controls the slope of the marker lines by controlling the amplitude of output signal 41 as applied to the grid of tube V28. The low-impedance circuit 15, constituted by resistances, is a mixing circuit in which occurs the superposition of signal 41 (short-duration sawtooth signal) upon the composite signal 31 coming over conductor 43. At the output of tube V29 the resulting signal appears which, through the output 16, is then directed to the horizontal deflection circuit of the cathode-ray tube 100.

By reference to FIGURE 2 it will be seen that the long-period sawtooth signal 50 (graph g) has a duration which is many times greater than the spacing of consecutive reference pulses 51, the latter in turn being separated by an interval exceeding the duration of the signals 30 and 31 as will be particularly apparent from graph *i*. The progressive lengthening of a sloping leading-edge portion 31' of the staircase signal 31 will also be evident from graph *i* of FIGURE 2.

The system described above and illustrated in the drawing may, of course, be modified in various respects without departing from the spirit and scope of the invention as defined in the appended claims.

What is claimed is:

1. Display apparatus comprising a cathode-ray tube having a screen and horizontal and vertical deflection means, and circuit means connected to said horizontal and vertical deflection means for producing markers on said screen in the form of solid parallel lines; said circuit means including means for generating component voltage waves and varying said voltage waves relative to each other and combining the component voltage waves to produce a deflection signal causing said parallel lines to drift continuously across the screen in a given direction and for adjusting the speed of said drift, means for adjusting the spacing between said lines, and means for adjusting the slope of said lines with respect to said given direction.

2. Display apparatus according to claim 1, wherein said circuit means comprises means for generating a first relatively long-period sawtooth wave and a second relatively short-period sawtooth wave having a continuously variable phase difference therebetween, means for combining said first and second sawtooth waves so as to produce a staircase wave the first step of which has a continuously varying magnitude for causing said drift, and means for varying the magnitude of the short-period sawtooth wave and adding it to the staircase wave and applying said added waves to said horizontal deflection means for varying the slope of said parallel marker lines.

3. Display apparatus according to claim 2 wherein said means for adjusting the spacing between said lines includes means for adjustably amplifying said staircase wave.

4. Display apparatus according to claim 2 wherein said means for adjusting the spacing between said lines includes means for varying the amplitudes of the long-period and short-period sawtooth waves proportionally.

5. In combination, a cathode-ray tube provided with an observation screen and first and second deflection means for displacing a luminous spot along two co-ordinates across said screen, and a control system for said deflection means adapted to generate on said screen a series of equispaced parallel visible lines inclined at a selected angle different from 90° with reference to said co-ordinates; said system including a first generator of sawtooth waves of relatively short period, a second generator of sawtooth waves of relatively long period, first circuit means for applying the output of said first generator to said first deflection means, and second circuit means for applying a combination of the outputs of said first and second generators to said second deflection means.

6. In combination, a cathode-ray tube provided with an observation screen and first and second deflection means for displacing a luminous spot along two co-ordinates across said screen, and a control system for said deflection means adapted to generate on said screen a series of equispaced parallel visible lines inclined at a selectively variable angle different from 90° with reference to said co-ordinates; said system including a first generator of sawtooth waves of relatively short period, a second generator of sawtooth waves of relatively long period, first circuit means for applying the output of said first generator to said first deflection means, second circuit means for applying a combination of the outputs of said first and second generators to said second deflection means, and control means in one of said circuit means for varying the relative amplitudes of said short-period sawtooth waves as applied to said first and second deflection means.

7. In combination, a cathode-ray tube provided with an observation screen and first and second deflection means for displacing a luminous spot along two co-ordinates across said screen, and a control system for said deflection means adapted to generate on said screen a series of equispaced parallel visible lines drifting across said screen along one of said co-ordinates while being inclined at a selected angle with reference to said co-ordinates; said system including a first generator of relatively short-period sawtooth waves, a second generator of intermediate-period sawtooth waves, a third generator of relatively long-period sawtooth waves, a source of trigger pulses having a cycle length greater than the duration of an intermediate-period sawtooth from said second generator but substantially less than that of a long-period sawtooth from said third generator, a fourth generator having as its output a single sloping reference pulse of relatively short duration, said second and fourth generators being connected to said source for respectively producing an intermediate-period sawtooth and a reference pulse upon the occurrence of each trigger pulse, comparator means connected to the outputs of said third and fourth generators for producing a timing pulse upon the amplitudes of said reference pulse and of a simultaneously present long-period sawtooth attaining a predetermined relationship, said first generator being connected to said comparator means for producing a train of short-period sawteeth in response to said timing pulse, first circuit means for applying the output of said first generator to said first deflection means, and second circuit means for applying a combination of the outputs of said first and second generators to said second deflection means.

8. In combination, a cathode-ray tube provided with an observation screen and first and second deflection means for displacing a luminous spot along two co-ordinates across said screen, and a control system for said deflection means adapted to generate on said screen a series of equispaced parallel visible lines drifting across said screen along one of said co-ordinates while being inclined at a selectively variable angle with reference to said co-ordinates; said system including a first generator of relatively short-period sawtooth waves, a second generator of intermediate-period sawtooth waves, a third generator of relatively long-period sawtooth waves, a source of trigger pulses having a cycle length greater than the duration of an intermediate-period sawtooth from said second generator but substantially less than that of a long-period sawtooth from said third generator, a fourth generator having as its output a single sloping reference pulse of relatively short duration, said second and fourth generators being connected to said source for respectively producing an intermediate-period sawtooth and a reference pulse upon the occurrence of each trigger pulse, comparator means connected to the outputs of said third and fourth generators for producing a timing pulse upon the amplitudes of said reference pulse and of a simultaneously present long-period sawtooth attaining a predetermined relationship, said first generator being connected to said comparator means for producing a train of short-period sawteeth in response to said timing pulse, first circuit means for applying the output of said first generator to said first deflection means, second circuit means for applying a combination of the outputs of said first and second generators to said second deflection means, and control means in one of said circuit means for varying the relative amplitudes of said short-period sawtooth waves as applied to said first and second deflection means.

References Cited in the file of this patent

UNITED STATES PATENTS

| | | |
|---|---|---|
| 2,405,238 | Seeley | Aug. 6, 1946 |
| 2,420,516 | Bischoff | May 13, 1947 |
| 2,465,355 | Cook | Mar. 29, 1949 |
| 2,551,681 | Laurence | May 8, 1951 |
| 2,623,196 | Toulon | Dec. 23, 1952 |
| 2,698,401 | Korelich | Dec. 28, 1954 |
| 2,872,614 | Trousdale | Feb. 3, 1959 |